United States Patent
Andrivon et al.

(10) Patent No.: US 11,257,195 B2
(45) Date of Patent: Feb. 22, 2022

(54) METHOD AND DEVICE FOR DECODING A HIGH-DYNAMIC RANGE IMAGE

(71) Applicant: INTERDIGITAL VC HOLDINGS, INC., Wilmington, DE (US)

(72) Inventors: Pierre Andrivon, Liffre (FR); Edouard Francois, Bourg des Comptes (FR); Yannick Olivier, Thorigne Fouillard (FR); David Touze, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/488,581

(22) PCT Filed: Feb. 19, 2018

(86) PCT No.: PCT/EP2018/053984
§ 371 (c)(1),
(2) Date: Aug. 24, 2019

(87) PCT Pub. No.: WO2018/153800
PCT Pub. Date: Aug. 30, 2018

(65) Prior Publication Data
US 2020/0394774 A1    Dec. 17, 2020

(30) Foreign Application Priority Data

Feb. 24, 2017 (EP) .................................. 17305212
Feb. 28, 2017 (EP) .................................. 17158481

(51) Int. Cl.
*G06T 7/00* (2017.01)
*G06T 5/00* (2006.01)
(Continued)

(52) U.S. Cl.
CPC ............... *G06T 5/009* (2013.01); *G06T 5/50* (2013.01); *G06T 9/00* (2013.01); *H04N 19/184* (2014.11);
(Continued)

(58) Field of Classification Search
CPC .. G06T 5/009; G06T 5/50; G06T 5/00; G06T 2207/20208; G06T 2207/10024;
(Continued)

(56) References Cited

U.S. PATENT DOCUMENTS

2010/0183071 A1* 7/2010 Segall ...................... G06T 5/50
382/294
2012/0215329 A1* 8/2012 Jiang ..................... G06F 16/683
700/94

(Continued)

FOREIGN PATENT DOCUMENTS

CN   103069809 A    4/2013
CN   106233706 A    12/2016
(Continued)

OTHER PUBLICATIONS

Francois et al_Test model draft for SDR backward compatibility from CE2.2.a proposal, Technicolor, International Organisation for Standardisation Organisation Internationale De Normalisation ISO/LEC JTC1/SC29/WG 11 , Oct. 15, pp. 1-17.

(Continued)

*Primary Examiner* — Li Liu
(74) *Attorney, Agent, or Firm* — Invention Mine LLC

(57) ABSTRACT

The present principles relates to a method and device for reconstructing an HDR image by applying a reconstruction process on a SDR image whose the content is similar to the content of the HDR image but the dynamic range of the luminance values of said SDR image is lower than the dynamic range of the luminance values of said HDR image, (Continued)

said reconstruction process requiring parameters obtained from a bitstream. The method is characterized in that the method further comprises determining whether all the required parameters are available from the bitstream and recovering the lost or corrupted parameters from additional data, said reconstruction process further taking into account said recovered parameters.

19 Claims, 12 Drawing Sheets

(51) Int. Cl.
| | |
|---|---|
| H04N 19/184 | (2014.01) |
| H04N 19/186 | (2014.01) |
| H04N 19/46 | (2014.01) |
| H04N 19/98 | (2014.01) |
| G06T 5/50 | (2006.01) |
| G06T 9/00 | (2006.01) |

(52) U.S. Cl.
CPC ........... *H04N 19/186* (2014.11); *H04N 19/46* (2014.11); *H04N 19/98* (2014.11); *G06T 2207/20208* (2013.01)

(58) Field of Classification Search
CPC ...... G06T 9/00; H04N 19/184; H04N 19/186; H04N 19/46; H04N 19/98; H04N 19/30; H04N 19/65; H04N 19/20; H04N 19/70; H04N 9/69; H04N 21/2343; H04N 21/4402
See application file for complete search history.

(56) References Cited

U.S. PATENT DOCUMENTS

| | | | |
|---|---|---|---|
| 2013/0246077 A1 | 9/2013 | Riedmiller et al. | |
| 2014/0044372 A1* | 2/2014 | Mertens | H04N 19/98 382/248 |
| 2014/0210847 A1* | 7/2014 | Knibbeler | G06T 5/50 345/589 |
| 2015/0117551 A1* | 4/2015 | Su | H04N 19/65 375/240 |
| 2015/0245044 A1* | 8/2015 | Guo | H04N 19/98 375/240.03 |
| 2015/0358646 A1* | 12/2015 | Mertens | H04N 9/68 382/166 |
| 2016/0358584 A1 | 12/2016 | Greenebaum et al. | |
| 2017/0078706 A1* | 3/2017 | Van Der Vleuten | H04N 19/46 |
| 2017/0085879 A1* | 3/2017 | Minoo | H04N 19/124 375/240 |

FOREIGN PATENT DOCUMENTS

| | | |
|---|---|---|
| EP | 2866450 A1 | 4/2015 |
| EP | 2866450 B1 | 2/2019 |
| WO | 2015180854 A1 | 12/2015 |
| WO | 2017019818 A1 | 2/2017 |

OTHER PUBLICATIONS

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2015, pp. 1-634.

Anonymous, "High Dynamic Range Electro-Optical Transfer Function of Mastering Reference Displays", Society of Motion Picture and Television Engineers, SMPTE ST 2084:2014, Aug. 16, 2014, pp. 1-14.

Anonymous, "High-Performance Single Layer Directly Standard Dynamic Range (SDR) Compatible High Dynamic Range (HDR) System for use in Consumer Electronics devices (SL-HDR1)", European Telecommunications Standards Institute, Technical Specification, ETSI TS 103 433 v1.1.1, Aug. 2016, pp. 1-84.

Diaz et al. / Diaz et al., "Integrating HEVC Video Compression with a High Dynamic Range Video Pipeline", SMPTE Motion Imaging Journal, vol. 125, No. 1, Jan. 2016, pp. 14-21.

Francois et al. / Francois et al., "A Single-Layer HDR Video Coding Framework with SDR Compatibility"; IBC 2016 Conference, Amsterdam, Netherlands, Sep. 8, 2016, 10 pages.

Anonymous, "Advanced video coding for generic audiovisual services" IITU-T Telecommunication Standardization Sector of, ITU, Series H: Audiovisual and Multimedia Systems, Infrastructure of audiovisual services—Coding of moving video, Recommendation ITU-T H.265, Feb. 2016, pp. 1-807.

SMPTE, / "Mastering Display Color Volume Metadata Supporting High Luminance and Wide Color Gamut Images", ST 2086:2014, Oct. 13, 2014, pp. 1-6.

Anonymous, "Advanced video coding for generic audiovisual services", International Telecommunication Union, ITU-T Telecommunication Standardization Sector of ITU, Series H: Audiovisual and Multimedia Systems Infrastructure of audiovisual services, Recommendation ITU-T H.264, Jan. 2012, (680 pages).

Anonymous, "Reference software for ITU-T H.265 high efficiency video coding", International Telecommunication Union, ITU-T Telecommunication Standardization Sector of ITU, Series H: Audiovisual and Multimedia Systems, Recommendation ITU-T H.265, Oct. 2014, (12 pages).

\* cited by examiner

| Preset index (informative) | Peak luminance of reconst. HDR (range) | Container/content colour primaries of reconst. HDR |
|---|---|---|
| 0 | <= 1000 cd/m² | BT.709/BT.709 |
| 1 | <= 1000 cd/m² | BT.2020/BT.709 |
| 2 | <= 1000 cd/m² | BT.2020/P3 |
| 3 | ... | ... |

Fig. 5c

| presetIdx | TS 103 433 parameters/metadata values |
|---|---|
| 0 | Shadow gain: 1.16<br>Highlight gain: 2.0<br>MidTones Adjustment: 1.5<br>White stretch: 0<br>Black stretch: 0<br>Saturation Gain []: {(0,64); (24,64); (62,59); (140,61); (252,64); (255,64)} |
| 1 | Shadow gain: 1.033<br>Highlight gain: 2.0<br>MidTones Adjustment: 1.5<br>White stretch: 0<br>Black stretch: 0 |
| 2 | Shadow gain: 1.115<br>Highlight gain: 2.0<br>MidTones Adjustment: 1.5<br>White stretch: 0 |

Fig. 5d

METHOD AND DEVICE FOR DECODING A HIGH-DYNAMIC RANGE IMAGE

This application claims the benefit, under 35 U.S.C. § 365 of International Application PCT/EP2018/053984, filed Feb. 19, 2018, which was published in accordance with PCT Article 21(2) on Aug. 30, 2018, in English, and which claims the benefit of European Patent Application No. 17305212.7, filed on Feb. 24, 2017. and of European Patent Application No. 17158481.6, filed on Feb. 28, 2017.

1. FIELD

The present principles generally relate to image/video decoding. Particularly, but not exclusively, the technical field of the present principles are related to decoding of an image whose pixels values belong to a high-dynamic range.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, an image contains one or several arrays of samples (pixel values) in a specific image/video format which specifies all information relative to the pixel values of an image (or a video) and all information which may be used by a display and/or any other device to visualize and/or decode a image (or video) for example. An image comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Low-Dynamic-Range images (LDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values representing luminance levels are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

The arrival of the High Efficiency Video Coding (HEVC) standard (*ITU-T H.265 Telecommunication standardization sector of ITU* (10/2014), *series H: audiovisual and multimedia systems, infrastructure of audiovisual services—coding of moving video, High efficiency video coding, Recommendation ITU-T H.265*) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21).

SDR backward compatibility with decoding and rendering devices is an important feature in some video distribution systems, such as broadcasting or multicasting systems.

Dual-layer coding is one solution to support this feature. However, due to its multi-layer design, this solution is not adapted to all distribution workflows.

An alternative is a single Layer HDR distribution solution as defined by the ETSI recommendation ETSI TS 103 433 V.1.1.1 (2016-08). The reader may also refer to the IBC 2016 article ("A single-Layer HDR video coding framework with SDR compatibility", E. François and L. Van de Kerkhof, IBC 2016) for more details. This single layer distribution solution is SDR compatible and leverages SDR distribution networks and services already in place. It enables both high quality HDR rendering on HDR-enabled CE devices, while also offering high quality SDR rendering on SDR CE devices.

This single layer distribution solution is based on a single layer coding/decoding process and is codec independent (a 10 bits codec is recommended).

This single layer distribution solution uses side metadata (of a few bytes per video frame or scene) that can be used in a post-processing stage to reconstruct the HDR signal from a decoded SDR signal.

This single layer distribution solution preserves quality of HDR content (artistic intent), i.e. there is no visible impairment due to the SDR compatibility feature in comparison with HEVC coding with a bit depth of 8-bits to 10-bits per sample with 4:2:0 chroma sampling (so-called HEVC main 10 profile).

Metadata may be static or dynamic. Static metadata means metadata that remains the same for a video (set of images) and/or a program.

Static metadata does not depend on the image content. They may define, for example, image format or color space, color gamut. For instance, SMPTE ST 2086:2014, "Mastering Display Color Volume Metadata Supporting High Luminance and Wide Color Gamut Images" is such a kind of static metadata for use in production environment. The Mastering Display Colour Volume (MDCV) SEI (Supplemental Enhanced Information) message is the distribution flavor of ST 2086 for both H.264/AVC ("*Advanced video coding for generic audiovisual Services*", SERIES H: AUDIOVISUAL AND MULTIMEDIA SYSTEMS, Recommendation ITU-T H.264, Telecommunication Standardization Sector of ITU, January 2012) and HEVC video codecs.

Dynamic metadata are content-dependent, that is metadata change with the image/video content, e.g. for each image or when each group of images. As an example, SMPTE ST 2094:2016 standards families, "Dynamic Metadata for Color Volume Transform" are dynamic metadata for use in production environment. SMPTE ST 2094-30 can be distributed along HEVC coded video stream thanks to the Colour Remapping Information SEI message.

However, dynamic metadata transmission in actual real-world production and distribution facilities were hard to guarantee and could be possibly lost because of overlay, logo and layout management, splicing, professional equipment pruning bitstream, stream handling by affiliates and current lack of standardization for the carriage of metadata throughout the post-production/professional plant. This single layer distribution solution cannot work without the presence of different bunch of dynamic metadata with some of them being critical for guaranteeing the success of the HDR reconstruction stage.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for reconstructing an HDR image by applying a reconstruction process on an SDR image whose the content is similar to the content of the HDR image but the dynamic range of the luminance values of said SDR image is lower than the dynamic range of the luminance values of said HDR image, said reconstruction process requiring parameters obtained from a bitstream. The method is characterized in that the method further comprises determining whether all the required parameters are available from a bitstream and recovering the lost or corrupted parameters from additional data, said reconstruction process further taking into account said recovered parameters.

According to an embodiment, a required parameter is lost when it is not retrieved from a bitstream.

According to an embodiment, a required parameter is considered as being corrupted when its value is out of a range of values or when said parameter does not have a coherent value according to other parameter values.

According to an embodiment, the lost or corrupted parameters are recovered from at least one set of pre-determined parameter values.

According to an embodiment, a set of pre-determined parameter values used for recovering at least one lost or corrupted parameter is identified according to an indicator signalled in the bitstream.

According to an embodiment, a set of d parameter values used for recovering at least one lost or corrupted parameter is identified according to an indicator derived from metadata carried by a bitstream.

According to an embodiment, said indicator is hidden in metadata carried by the bitstream.

According to an embodiment, the lost parameters are recovered from parameters used for decoding previous HDR images.

According to an embodiment, the lost parameters are recovered from a weighted combination of the parameters used for decoding previous HDR images.

According to an embodiment, the weights used by said weighted combination depends on the temporal distance of the previously decoded HDR images and the HDR images to be decoded.

According to other of their aspects, the present principles relate to a device for reconstructing an HDR image, a non-transitory processor-readable medium whose contents store a SDR video and metadata relative to parameters used for reconstructing a HDR video and a signal having a SDR video and parameter values used for reconstructing a HDR video from said SDR video.

4. BRIEF DESCRIPTION OF DRAWINGS

In the drawings, examples of the present principles are illustrated. It shows:

FIG. 5c illustrates a non-limitative example of a table that maps presets index to ranges of peak luminance and colour primaries when a preset gathers the reconstruction parameter values;

FIG. 5d illustrates a non-limitative example of a table that maps presets index to ranges of peak luminance and colour primaries when a preset gathers the reconstruction parameter values;

Similar or same elements are referenced with the same reference numbers.

5. DESCRIPTION OF EXAMPLE OF THE PRESENT PRINCIPLES

Figure 1:
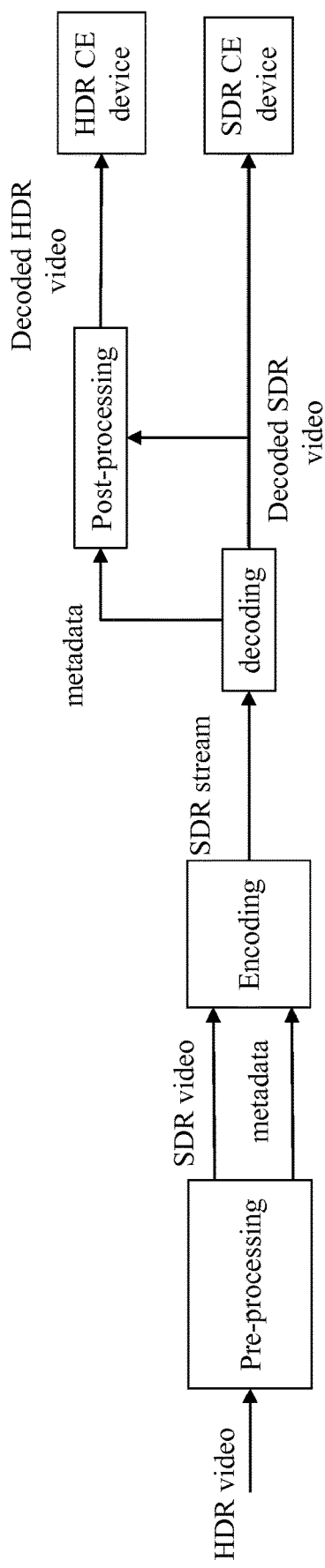
FIG. 1 shows an end-to-end workflow supporting content production and delivery to HDR and SDR displays.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for coding/decoding/reconstructing an image but extends to the coding/decoding/reconstruction of a sequence of images (video) because each image of the sequence is sequentially encoded/decoded/reconstructed as described below.

FIG. 1 shows an end-to-end workflow supporting content production and delivery to HDR and SDR displays. It involves a single-layer SDR/HDR encoding-decoding with side metadata as defined, for example, in ETSI TS 103 433. The reader may also refer to the IBC 2016 article ("A single-Layer HDR video coding framework with SDR compatibility", E. François and L. Van de Kerkhof, IBC 2016) for more details.

At a pre-processing stage, an incoming HDR video is decomposed in an SDR video and static and dynamic metadata. The SDR video is then encoded with any SDR video codec and an SDR bitstream is carried throughout an existing legacy distribution network with accompanying metadata conveyed on a specific channel or embedded in the SDR bitstream.

Preferably, the video coded is an HEVC codec such as the H.265/HEVC codec or H.264/AVC.

The metadata are typically carried by SEI messages when used in conjunction with an H.265/HEVC or H.264/AVC codec.

The SDR bitstream is decoded and a decoded SDR video is then available for an SDR Consumer Electronics (CE) display.

Next, at a post-processing stage, which is functionally the inverse of the pre-processing stage, the HDR video is reconstructed from the decoded SDR video and static/dynamic metadata obtained from a specific channel or from the SDR bitstream.

Figure 2A:
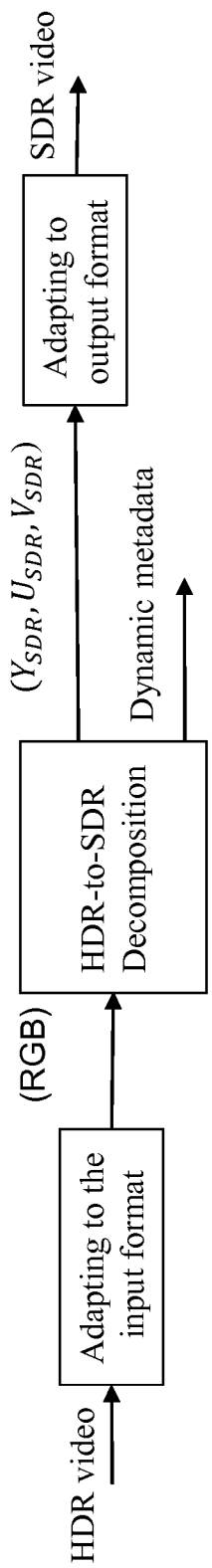
FIG. 2a depicts in more details the pre-processing stage.

FIG. 2a depicts in more details the pre-processing stage.

The core component of the pre-processing stage is the HDR-to-SDR decomposition that generates an SDR video and dynamic metadata from the HDR video.

More precisely, the HDR-to-SDR decomposition aims at converting a HDR video represented in a specific input format (here RGB) to a SDR video represented in a specific output format (here $Y_{SDR}$, $U_{SDR}$, $V_{SDR}$) according to the embodiment discloses below but the present principles are not limited to specific input/output format (color space or gamut).

Optionally, the format of the HDR video, respectively the format of the SDR video, may be adapted to said specific input format, respectively specific output format.

Said input/output format adaptation may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc. Note that the well-known YUV color space refers also to the well-known YCbCr or Y'CbCr or Y'C'bC'r in the prior art.

Figure 2B:
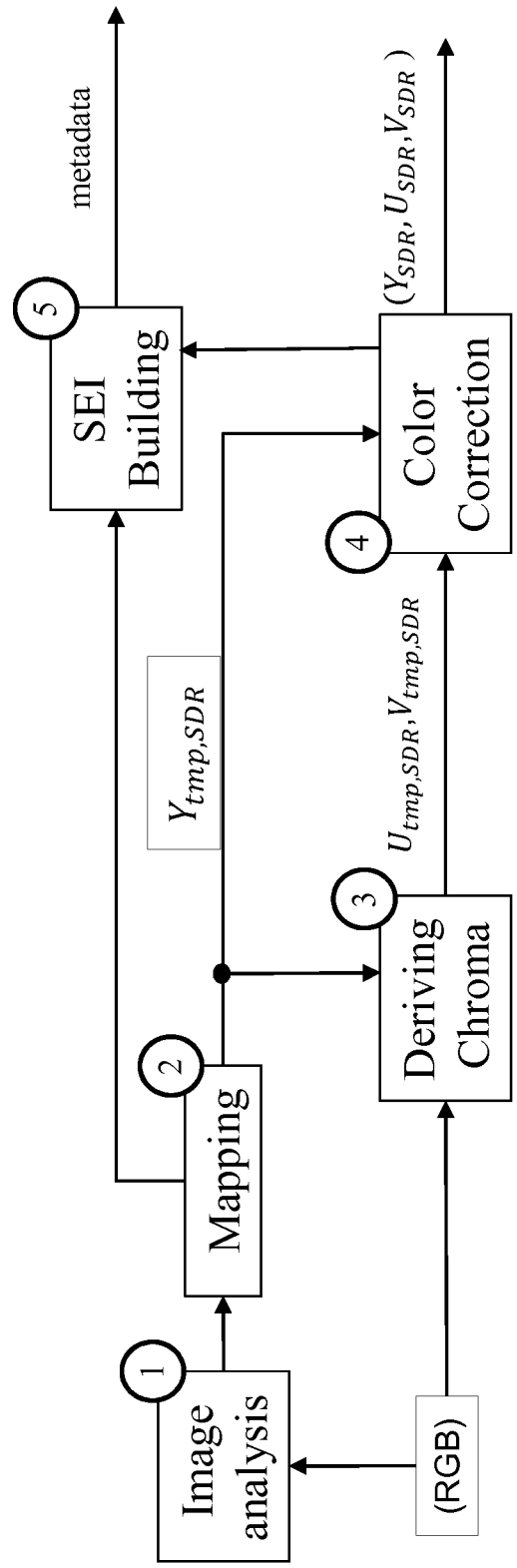
FIG. 2b depicts the HDR-to-SDR decomposition in more details.

FIG. 2b depicts the HDR-to-SDR decomposition in more details.

In the following, the HDR video samples are represented in the RGB color space (specific input format) and the SDR video samples are represented in the YUV color space (specific output format).

The HDR-to-SDR decomposition process applies image by image and each input HDR image to be decomposed is an image of the HDR video represented by three color components R, G, B.

An output SDR image of the SDR video outputs the HDR-to-SDR decomposition process and each output SDR image is an image of the SDR video represented by a SDR luma component $Y_{SDR}$ and two SDR chroma components $U_{SDR}$, $V_{SDR}$.

In step 1, the input HDR image (RGB) is analyzed in order to derive a set of mapping parameters that will be further used to convert the HDR video into SDR video. An example of automatic analysis is detailed in ETSI TS 103 433 (annex C.3). Optionally, said analysis may be done for only some images of the HDR video. In that case, the mapping parameters relative to an image are re-used until new mapping parameters are obtained.

In step 2, a luminance component L is obtained from the RGB components of an input HDR image (equation 1) and said luminance component L is mapped to a SDR luma component $Y_{tmp,SDR}$ (equation 2).

Such a mapping is based on a perceptual transfer function TM, whose goal is to convert a luminance component into an SDR luma component. Said perceptual transfer function TM is defined from a limited set of mapping parameters.

Figure 2C:
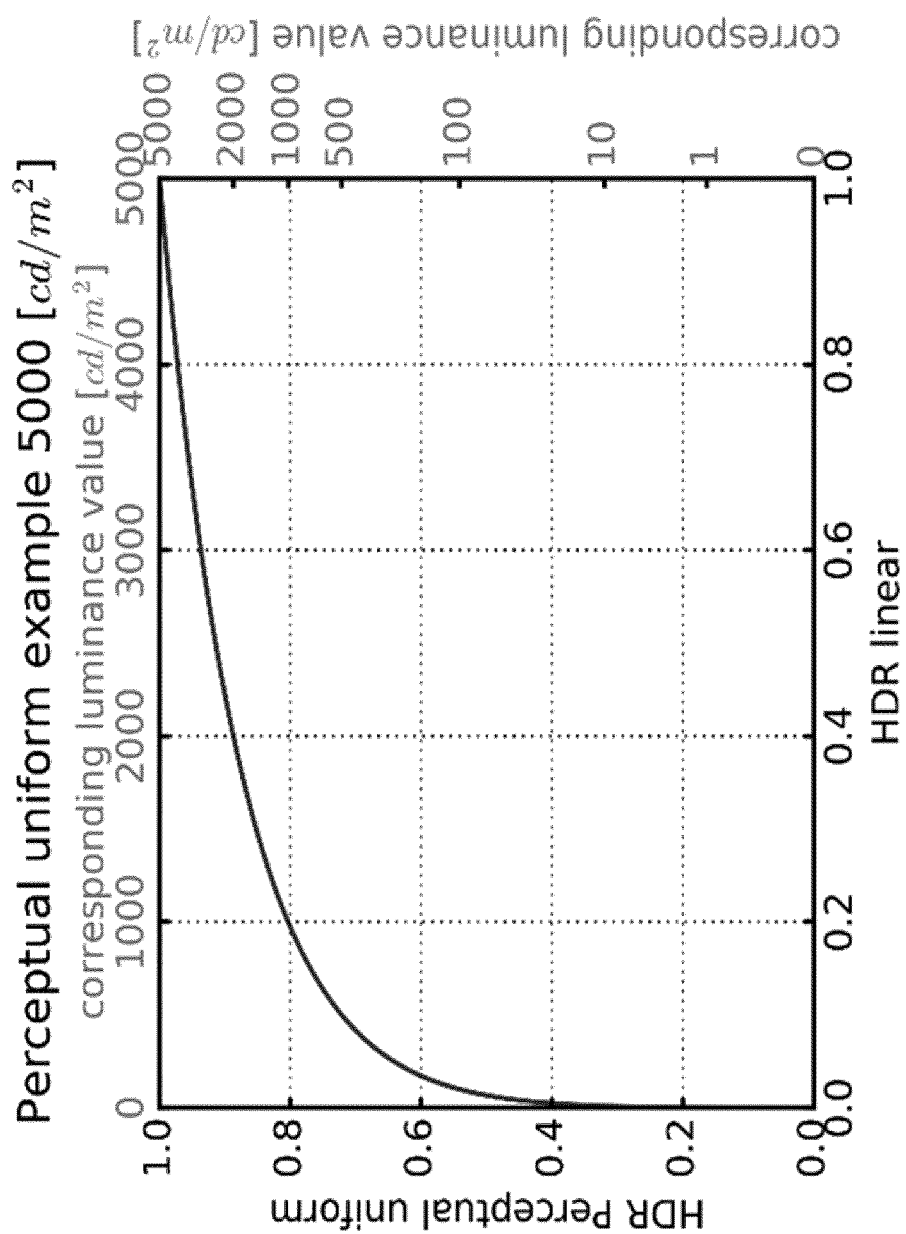
FIG. 2c shows an example of a perceptual transfer function.
Figure 2D:
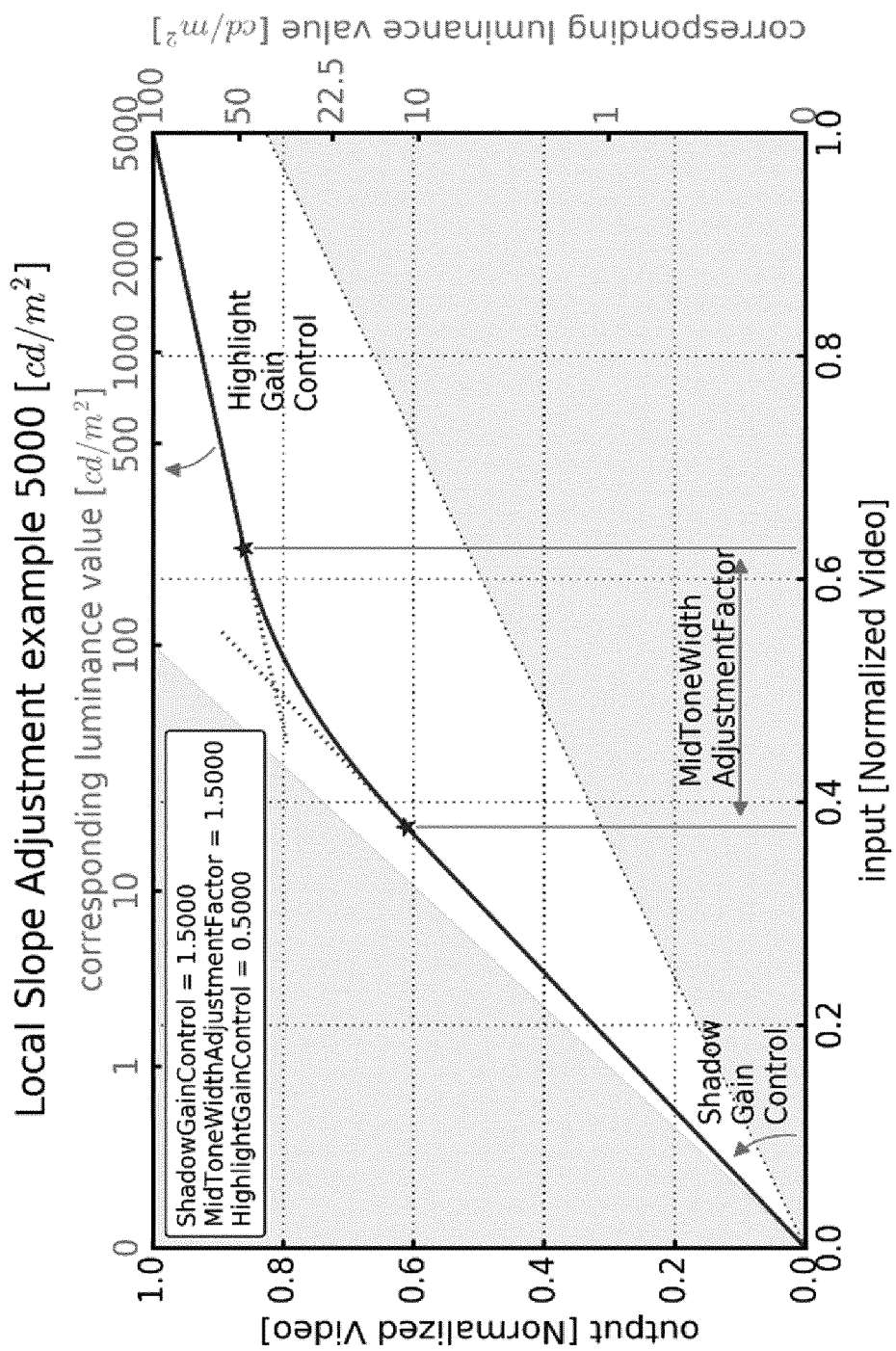
FIG. 2d shows an example of a piece-wise curve used for luminance mapping.

The process works as follows: the luminance component L is first converted to a perceptually-uniform domain using the perceptual transfer function TM illustrated in FIG. 2c. This conversion is controlled by a mastering display peak luminance parameter (equal to 5000 cd/m² in FIG. 2c). To better control the black and white levels, a signal stretching between content-dependent black and white levels (parameters tmInputSignalBlackLevelOffset and tmInputSignalWhiteLevelOffset) is applied. Then the converted signal is mapped using a piece-wise linear curve constructed out of three parts, as illustrated in FIG. 2d. The lower and upper sections are linear, the steepness being determined by the shadowGain and highlightGain parameters respectively. The mid-section is a parabola providing a smooth bridge between the two linear sections. The width of the cross-over is determined by the midToneWidthAdjFactor parameter.

Optionally, a piece-wise linear corrective function can be further applied to the converted signal to fine-tuned the previous piecewise linear curve.

For example, said piece-wise linear corrective function is defined from tmOutputFineTuning parameters including two 1D arrays with tmOutputFineTuningNumVal entries denoted tmOutputFineTuningX and tmOutputFineTuningY. Each entry i of said 1D arrays tmOutputFineTuningX(i) and tmOutputFineTuningY(i) defines a pivot point of said piece-wise linear corrective function. Usually, said parameters are denoted the tmOutputFineTuning parameters.

Mathematically speaking, the SDR luma component $Y_{tmp,SDR}$ is given by:

$$L = A_1 \begin{bmatrix} R \\ G \\ B \end{bmatrix} \quad (1)$$

$$Y_{tmp,SDR} = TM[L] \quad (2)$$

where $A=[A_1 A_2 A_3]^T$ is the canonical 3×3 R'G'B'-to-Y'C'bC'r (also referred to YUV) conversion matrix (e.g. as specified in ITU-R Rec. BT.2020 or ITU-R Rec. BT.709 depending on the color space), $A_1 A_2 A_3$ being 1×3 matrices.

Note, an inverse-mapped component $\hat{L}$ may be obtained by applying the reciprocal of the mapping (reciprocal of the perceptual transfer function TM), denoted ITM, to the SDR luma component $Y_{tmp,SDR}$:

$$\hat{L} = ITM(Y_{tmp,SDR}) \quad (3)$$

Note that the look-up-table lutMapY defined in ETSI TS 103 433 implements the inverse gamma of $ITM(Y_{tmp,SDR})$ function:

$$\hat{L}^{1/\gamma} = \text{lutMap}Y(Y_{tmp,SDR}) = (ITM(Y_{tmp,SDR}))^{1/\gamma}$$

Figure 2E:
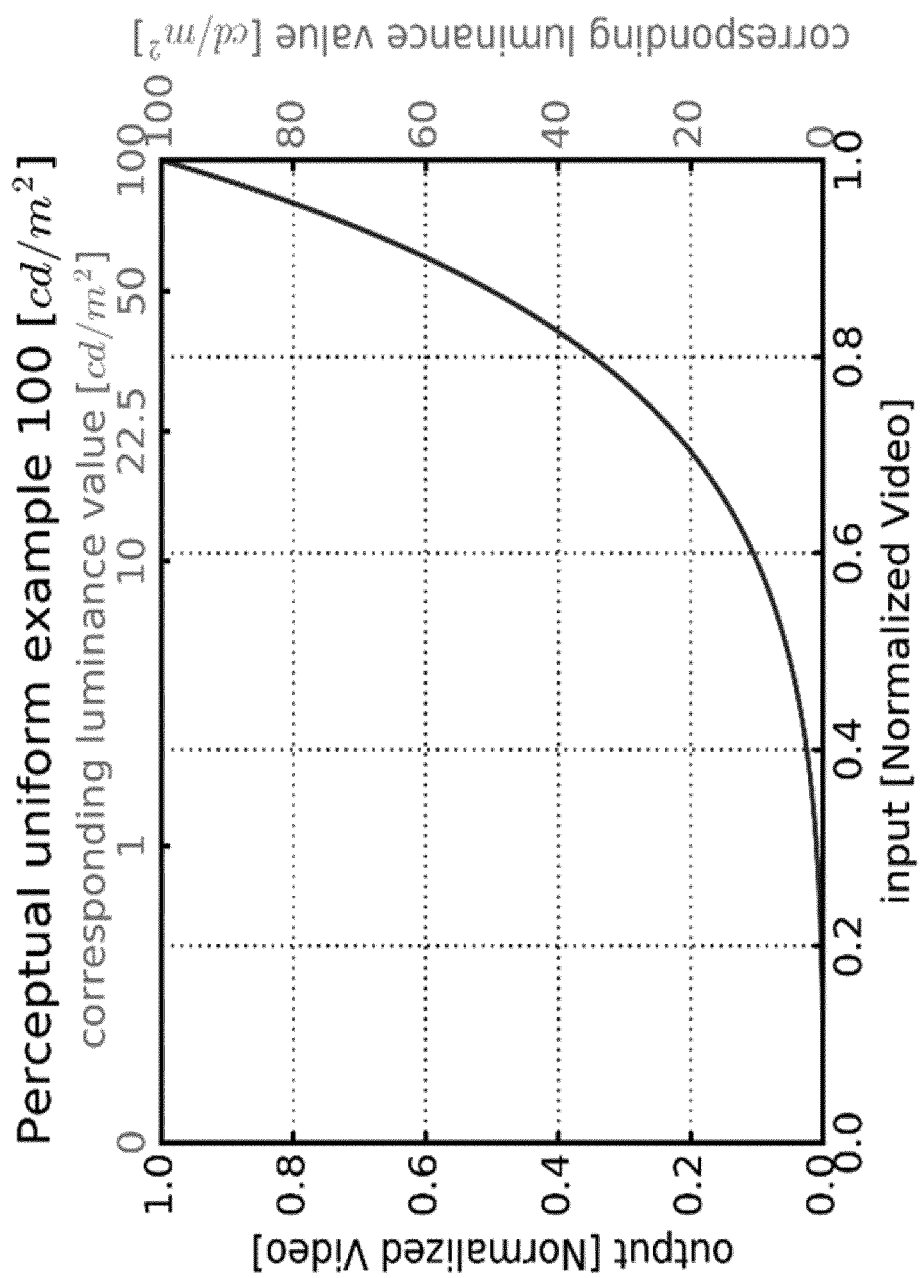
FIG. 2e shows an example of a curve used for converting back a perceptually optimized video signal to a linear light domain.

FIG. 2e shows an example of the function ITM to illustrate how the signal may be converted back to the linear light domain based on a targeted SDR display maximum luminance, for example 100 cd/m².

In step 3 in FIG. 2b, two HDR chroma components $U_{tmp,SDR}$, $V_{tmp,SDR}$, are then derived as follows.

First a transfer function (Gamma function) close to the ITU-R Rec. BT.709 OETF (Opto-Electrical Transfer Function) (preferably γ=2.0) is applied on the R, G, B components of the input HDR image. The resulting color components are then converted to chroma components and said chroma components are then scaled by a HDR luma component ($\hat{L}^{1/\gamma}$) obtained from the inverse-mapped component $\hat{L}$.

Mathematically speaking, the chroma components $U_{tmp,SDR}$, $V_{tmp,SDR}$ are given by:

$$\begin{bmatrix} U_{tmp,SDR} \\ V_{tmp,SDR} \end{bmatrix} = \frac{1}{\hat{L}^{1/\gamma}} * \begin{bmatrix} A_2 \\ A_3 \end{bmatrix} * \begin{bmatrix} R^{1/\gamma} \\ G^{1/\gamma} \\ B^{1/\gamma} \end{bmatrix} \quad (4)$$

with γ=2.0 for example,

Note that equation (4) guarantees the reversibility of the HDR-to-SDR decomposition.

In step 4, a color correction is applied on the chroma components $U_{tmp,SDR}$, $V_{tmp,SDR}$ in order to match the SDR colors to the HDR video colors. First the chroma components $U_{tmp,SDR}$, $V_{tmp,SDR}$ are adjusted by a scaling factor $1/\beta(Y_{tmp,SDR})$, where $\beta(Y_{tmp,SDR})$ is a function that enables to control the color saturation and hue of the resulting SDR video.

$$\begin{bmatrix} U_{SDR} \\ V_{SDR} \end{bmatrix} = \frac{1}{\beta(Y_{tmp,SDR})} * \begin{bmatrix} U_{tmp,SDR} \\ V_{tmp,SDR} \end{bmatrix} \quad (5)$$

where $$\beta(Y_{tmp,SDR}) = \frac{\beta_0(Y_{tmp,SDR})}{\hat{L}^{1/\gamma}}$$

where $\beta_0(Y_{tmp,SDR})$ may be a function defined in the clause C.3.4.2 of ETSI TS 103 433.

Note that the function $\beta(T_{tmp,SDR})$ may be implemented by the look-up-table lutCC defined in ETSI TS 103 433.

The function $\beta(Y_{tmp,SDR})$ is dynamic color matadata that may be conveyed to the reconstruction stage as explained later.

Optionally, the SDR luma component $Y_{tmp,SDR}$ may be adjusted to further control the perceived saturation, as follows:

$$Y_{SDR} = Y_{tmp,SDR} - \text{Max}(0, \text{Mua} \times U_{SDR} + \text{Mub} \times V_{SDR}) \quad (6)$$

where Mua and Mub are two control parameters (also denoted chroma to luma injection parameters chromaToLumaInjectionMuA and chromaToLumaInjectionMuB) for adjusting the luminance mapping. As an example, Mua=0.5 and Mub=0.486369.

Controlling the perceived saturation of the SDR luma component $Y_{tmp,SDR}$ improves the visual quality of the decoded SDR image when displayed.

Possibly, parameters Mua/chromaToLumaInjectionMuA and Mub/chromaToLumaInjectionMuB are hidden in a saturationGain function (clauses 6.2.4, 6.3.4, 7.2.3.2 of ETSI TS 103 433). Said saturationGain function allows fine-tuning the color correction curve and uses several parameters such as saturationGainNumVal for the number of entries of two 1D arrays of real values: saturationGainX(i) and saturationGainX(i) for the values of each entry i.

Step 4 allows to control the SDR colors and to guarantee their matching to the HDR colors. This is in general not possible when using a fixed transfer function.

In step 5, dynamic metadata relative to the mapping (step 2) and color correction (step 4) are conveyed to the post-processing stage.

These dynamic metadata enable to finely control the texture and colors of the SDR version, and to ensure a good fitting to the HDR intent.

Figure 3A:
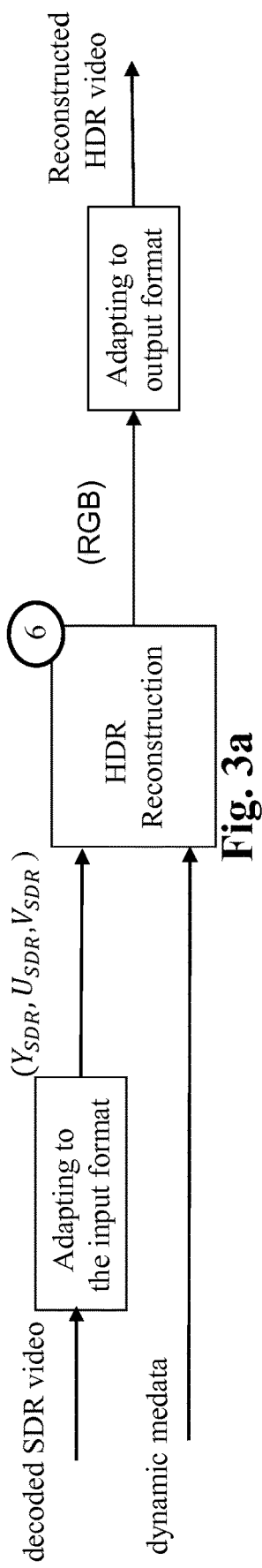
FIG. 3a depicts in more details the post-processing stage.

FIG. 3a depicts in more details the post-processing stage.

The core component of the post-processing stage is the HDR reconstruction (step 6) that generates a reconstructed HDR video from a decoded SDR video and dynamic metadata.

More precisely, the HDR reconstruction aims at converting SDR video represented in a specific input format (here $Y_{SDR}$, $U_{SDR}$, $V_{SDR}$) to an output HDR video represented in a specific output format (here RGB) according to the embodiment discloses below but the present principles are not limited to specific input/output specific formats (color space or gamut).

Said input or output format adapting may include color space conversion and/or color gamut mapping. Usual format adapting processes may be used such as RGB-to-YUV (or YUV-to-RGB) conversion, BT.709-to-BT.2020 or BT.2020-to-BT.709, down-sampling or up-sampling chroma components, etc. Annex E of the ETSI recommendation ETSI TS 103 433 provides an example of format adapting processes and inverse gamut mapping (Annex D).

Optionally, the format of the reconstructed HDR video may be adapted to a targeted system characteristics (e.g. a Set-Top-Box, a connected TV) and/or an inverse gamut mapping may be used when the decoded SDR video (input of the HDR reconstruction stage) and the reconstructed HDR video (output of the HDR reconstruction stage) are represented in different color spaces and/or gamut.

Figure 3B:
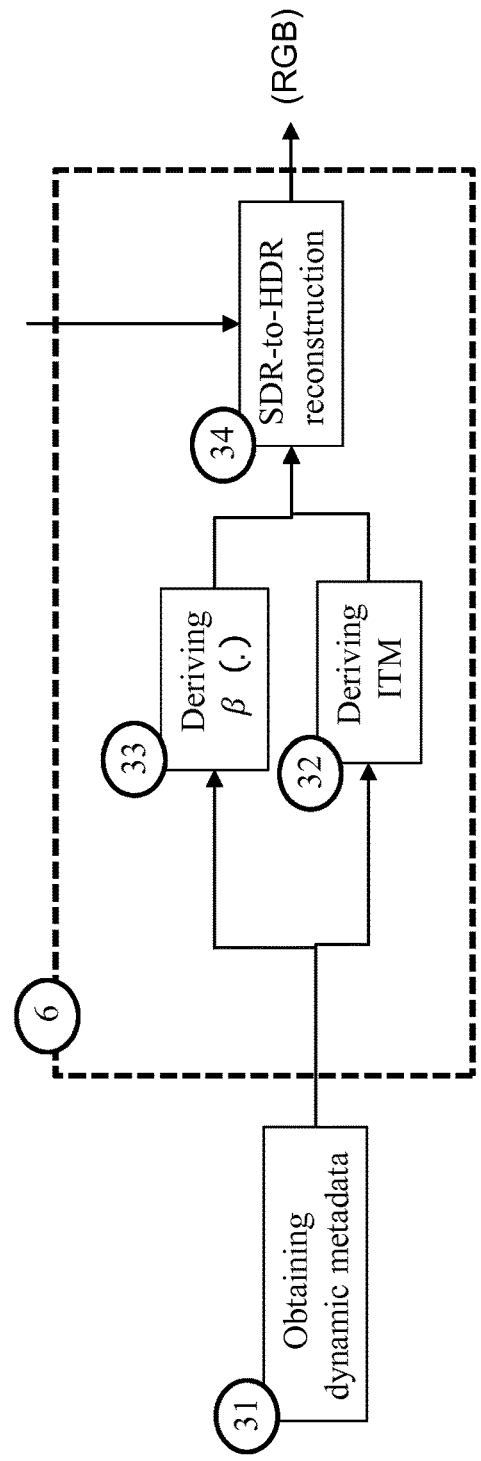
FIG. 3b depicts in more details the HDR reconstruction process.

FIG. 3b depicts in more details the HDR reconstruction process (step 6).

The HDR reconstruction is the functional inverse of the HDR-to-SDR decomposition (FIG. 2b). However, for implementation complexity reasons, some operations are concatenated or applied in a different order.

In step 31, dynamic metadata are obtained, for example from the SDR bitstream or from a specific channel.

In step 32, an inverse, denoted ITM, of the perceptual transfer function TM is derived from the obtained dynamic metadata as explained below. This function ITM (equation 3) corresponds to the inverse mapping given by equation (2).

In step 33, a function $\beta(.)$, given by equation (4), is derived from the obtained dynamic metadata as explained below.

In step 34, a reconstructed HDR image (RGB) of the reconstructed HDR video (linear-light HDR video) is reconstructed by applying a SDR-to-HDR reconstruction to a decoded SDR image ($Y_{SDR}$, $U_{SDR}$, $V_{SDR}$) of the decoded SDR video using the derived function ITM and the derived function $\beta(.)$.

More precisely, in step 34, a reconstructed HDR image is reconstructed from the SDR luma component $Y_{SDR}$ and the SDR chroma components $U_{SDR}$, $V_{SDR}$ as follows.

First, intermediate components $Y_{post}$, $U_{post}$ and $V_{post}$ are derived as:

$$Y_{post} = \mathrm{Clamp}(0, 2^B-1, Y_{SDR} + \mathrm{Max}(0, \mathrm{Mua} \times U_{SDR} + \mathrm{Mub} \times V_{SDR}) \quad (7)$$

$$\begin{bmatrix} U_{post} \\ V_{post} \end{bmatrix} = \beta[Y_{post}] \times \begin{bmatrix} U_{SDR} \\ V_{SDR} \end{bmatrix} \quad (8)$$

where B is the number of bits used to represent the decoded SDR samples.

The reconstruction of the HDR linear-light R, G, B values is made of the following steps.

A parameter T is first computed as:

$$T = k0 \times U_{post} \times V_{post} + k1 \times U_{post} \times U_{post} + k2 \times V_{post} \times V_{post} \quad (9)$$

where k0, k1, k2 are pre-defined parameters that depend on the coefficients of the canonical 3×3 conversion matrix A used in the pre-processing, e.g. the R'G'B'-to-Y'C'bC'r conversion matrix. For instance, when the related SDR color space is BT.709, k0=0.12562, k1=0.27372, k2=0.68402.

Intermediate components ($R_{im}$, $G_{im}$, $B_{im}$) are then derived as follows:

$$\begin{bmatrix} R_{im} \\ G_{im} \\ B_{im} \end{bmatrix} = A^{-1} \times \begin{bmatrix} \sqrt{1-T} \\ U_{post} \\ V_{post} \end{bmatrix} \quad (10)$$

Then, second intermediate components ($R_1$, $G_1$, $B_1$) are then obtained by:

$$\begin{bmatrix} R_1 \\ G_1 \\ B_1 \end{bmatrix} = (ITM[Y_{post}])^{1/\gamma} \times \begin{bmatrix} R_{im} \\ G_{im} \\ B_{im} \end{bmatrix} \quad (11)$$

And, Finally, the (RGB) components relative to the HDR output image are given by:

$$\begin{bmatrix} R \\ G \\ B \end{bmatrix} = \begin{bmatrix} R_1^\gamma \\ G_1^\gamma \\ B_1^\gamma \end{bmatrix} \quad (12)$$

Optionally, a clamping may be done to 0, $\mathrm{Lmax}_{HDR}$, where $\mathrm{Lmax}_{HDR}$ is the HDR mastering display peak luminance.

It can be demonstrated that equations (8) to (12) invert the pre-processing operation of equations (1) to (5).

When T is larger than 1 (which is in principle not possible, but may happen because of quantization and compression), $U_{post}$ and $V_{post}$ are scaled by $1/\sqrt{T}$, the resulting T then becoming 1.

The post-processing operates on the function ITM (step 32) and the function $\beta(.)$ (step 33) derived from dynamic metadata (step 31).

Said dynamic metadata may be conveyed (step 5) according to either a so-called parameter-based mode or a table-based mode in order to derive the function ITM (step 32) and the function $\beta(.)$ (step 33) from obtained dynamic metadata (step 31).

The parameter-based mode may be of interest for distribution workflows which primary goal is to provide direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams.

In the parameter-based mode, dynamic metadata to be conveyed in step 5 are luminance mapping parameters representative of the inverse function ITM, i.e.
tmInputSignalBlackLevelOffset;
tmInputSignalWhiteLevelOffset;
shadowGain;
highlightGain;
midToneWidthAdjFactor;
tmOutputFineTuning parameters;
the parameters Mua/chromaToLumaInjectionMuA and Mub/chromaToLumaInjectionMuB.

Moreover, other dynamic metadata to be conveyed in step 5 are color correction parameters (saturationGainNumVal, saturationGainX(i) and saturationGainY(i)) used to define the function β(.) (ETSI recommendation ETSI TS 103 433 clauses 6.2.5 and 6.3.5).

Note the muA/chromaToLumaInjectionMuA and muB/chromaToLumaInjectionMuB, may be respectively carried/hidden in the saturationGain function parameters as explained above.

These dynamic metadata may be conveyed using the HEVC Colour Volume Reconstruction Information (CVRI) user data registered SEI message whose syntax is based on the SMPTE ST 2094-20 specification (ETSI recommendation ETSI TS 103 433 Annex A.3).

Typical dynamic metadata payload is about 25 bytes per scene.

In step 31, the CVRI SEI message is thus parsed to obtain mapping parameters and color-correction parameters.

In step 32, the function ITM is reconstructed (derived) from the obtained mapping parameters (see ETSI TS 103 433 clause 7.2.3.1 for more details).

In step 33, the function β(.) is reconstructed (derived) from the obtained color-correction parameters (see ETSI TS 103 433 clause 7.2.3.2 for more details).

In the table-based mode, dynamic data to be conveyed in step 5 are pivots points of a piece-wise linear curve representative of the function ITM. For example, the dynamic metadata are luminanceMappingNumVal that indicates the number of the pivot points, luminanceMappingX that indicates the x values of the pivot points, and luminanceMappingY that indicates the y values of the pivot points (see the ETSI recommendation ETSI TS 103 433 clauses 6.2.6 and 6.3.6 for more details). Besides, Mua/chromaToLumaInjectionMuA and Mub/chromaToLumaInjectionMuB that respectively indicate the ratio of the blue and red colour-difference component injection in the luma component, are also dynamic metadata carried explicitly in the table-based mode.

Moreover, other dynamic metadata to be conveyed in step 5 may be pivots points of a piece-wise linear curve representative of the function β(.). For example, the dynamic metadata are colorCorrectionNumVal that indicates the number of pivot points, colorCorrectionX that indicates the x values of pivot points, and colorCorrectionY that indicates the y values of the pivot points (see the ETSI recommendation ETSI TS 103 433 clauses 6.2.7 and 6.3.7 for more details).

These dynamic metadata may be conveyed using the HEVC Colour Remapping Information (CRI) SEI message whose syntax is based on the SMPTE ST 2094-30 specification (ETSI recommendation ETSI TS 103 433 Annex A.4).

Typical payload is about 160 bytes per scene.

In step 31, the CRI SEI message is thus parsed to obtain the pivot points of a piece-wise linear curve representative of the function ITM and the pivot points of a piece-wise linear curve representative of the function β(.), and the chroma to luma injection parameters.

In step 32, the function ITM is derived from those of pivot points relative to a piece-wise linear curve representative of the function ITM (see ETSI TS 103 433 clause 7.2.3.3 for more details).

In step 33, the function β(.) is derived from those of said pivot points relative to a piece-wise linear curve representative of the function β(.) (see ETSI TS 103 433 clause 7.2.3.4 for more details).

Note that static metadata also used by the post-processing stage may be conveyed by SEI message. For example, the selection of either the parameter-based mode or table-based mode may be carried by the TS 103 433 Information (TSI) user data registered SEI message (payloadMode) as defined by ETSI TS 103 433 (clause A.2.2). Static metadata such as, for example, the color primaries or the maximum display mastering display luminance are conveyed by a Mastering Display Colour Volume (MDCV) SEI message as defined in AVC, HEVC.

Figure 4:
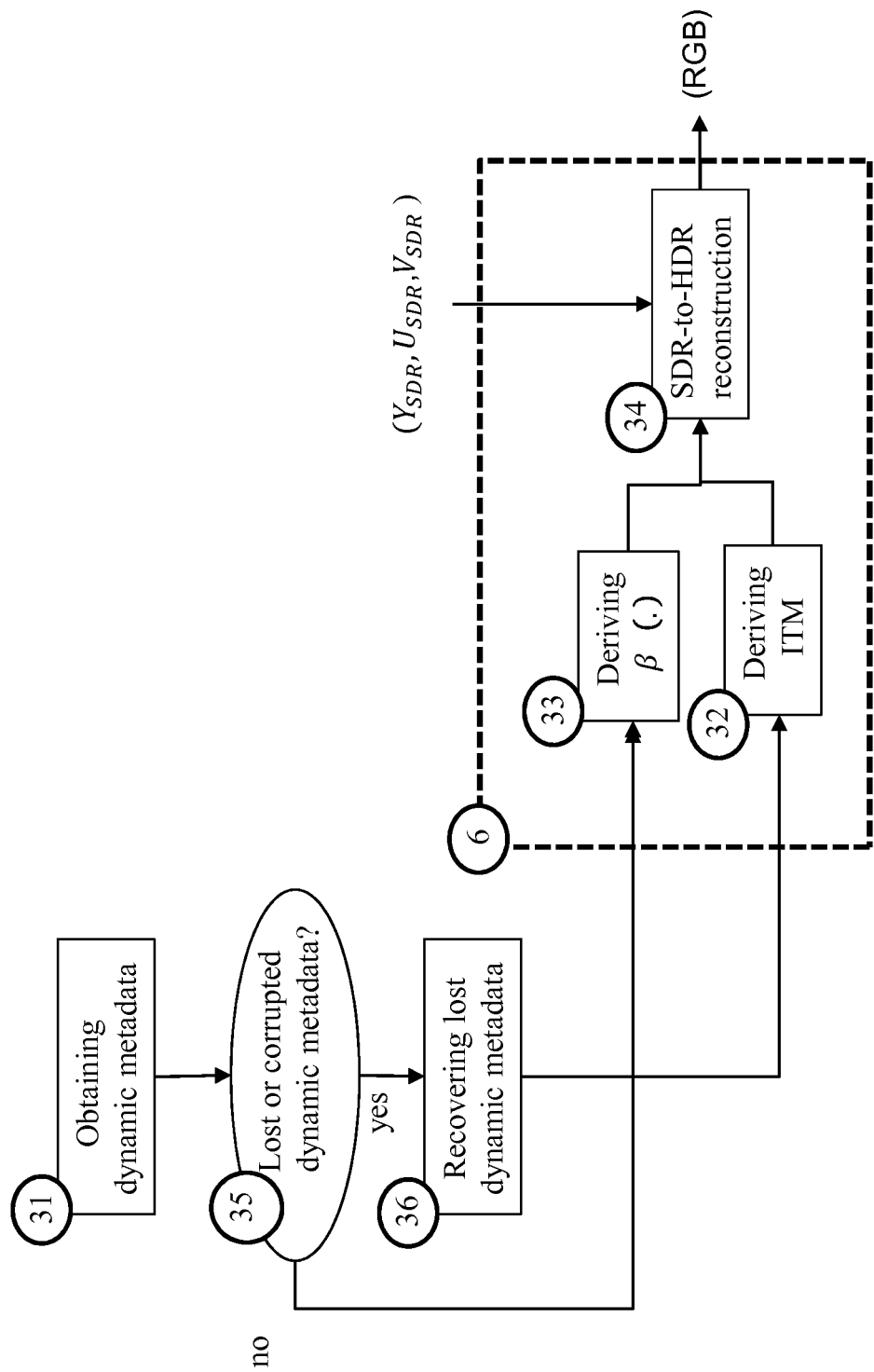
FIG. 4 shows a block diagram of the steps of a method for reconstructing a HDR image in accordance with examples of the present principles.

FIG. 4 shows a block diagram of the steps of a method for reconstructing an HDR image in accordance with examples of the present principles.

This method is based on any HDR reconstruction process requiring a SDR image and dynamic metadata as input.

For illustrative purpose, the HDR reconstruction process may be the HDR reconstruction process as described in relation with FIG. 3*b*. In that case, the reconstructed HDR image, represented by three color components RGB, is reconstructed from a decoded SDR image represented by three components ($Y_{SDR}$, $U_{SDR}$, $V_{SDR}$). The SDR image, used for reconstructing an HDR image may also be either obtained by decoding bitstream (e.g. a SDR bitstream as described above) or stored and obtained with or without requiring a decoding.

Then, the method obtains, for example by decoding a SDR bitstream, a (decoded) SDR image whose dynamic range of the luminance values is lower than the dynamic range of the luminance values of the HDR image to be reconstructed.

In step 31, dynamic metadata are obtained from a bitstream. Said bitstream may be the SDR bitstream or another bitstream transmitted over a specific channel. These dynamic metadata may be obtained, for example, by parsing SEI messages as explained above.

In step 35, the method determines whether all the required parameters are available from the bitstream.

When at least one parameter is lost or corrupted, in step 36, the lost or corrupted parameter(s) is (are) recovered from additional data.

In step 32 and 33, the function ITM and the function β(.) are derived from parameters obtained either from a bitstream or recovered parameters and in step 34, the HDR image is reconstructed by applying the SDR-to-HDR reconstruction process on said (decoded) SDR image and the parameters either obtained from the bitstream or recovered.

According to an embodiment of step 36, a required parameter is lost when it is not present in the bitstream.

For example, when the required parameters are carried by SEI message such as the CVRI or CRI SEI messages as described above, a required parameter is considered as being lost (not present) when the SEI message is not transmitted in the bitstream or when the parsing of the SEI message fails.

According to an embodiment, a required parameter is considered as being corrupted when its value is out of a range of values or when said parameter does not have a correct (no coherent) value according to other parameter values.

According to an embodiment of the step 36, the lost or corrupted parameters are recovered from at least one set of pre-determined parameter values previously stored (denoted preset). Each set of pre-determined parameter values is denoted a preset.

A preset may be stored before reconstructing a HDR image.

For example, a preset may gather a pre-determined value for at least one dynamic metadata carried by the CRI and/or CVRI SEI message.

Different presets may be determined and their number selection may be established empirically by determining statistical groups of average optimal parameters for different kind and type of content.

For example, a way to determinate a set of presets depends on the distributions of each parameter over a large set of HDR images of several peaks of luminance and represented with different color primaries. For different parameters, different kinds of distributions may occur. For each parameter, some values can be selected as being representative of a larger set of values.

In the following examples, that illustrates selection procedures of a representative value of a given parameter, the parameter (e.g. ShadowGain of ETSI TS 103 433 in this example) range belongs to the [0; 2] interval.

Figure 5A:
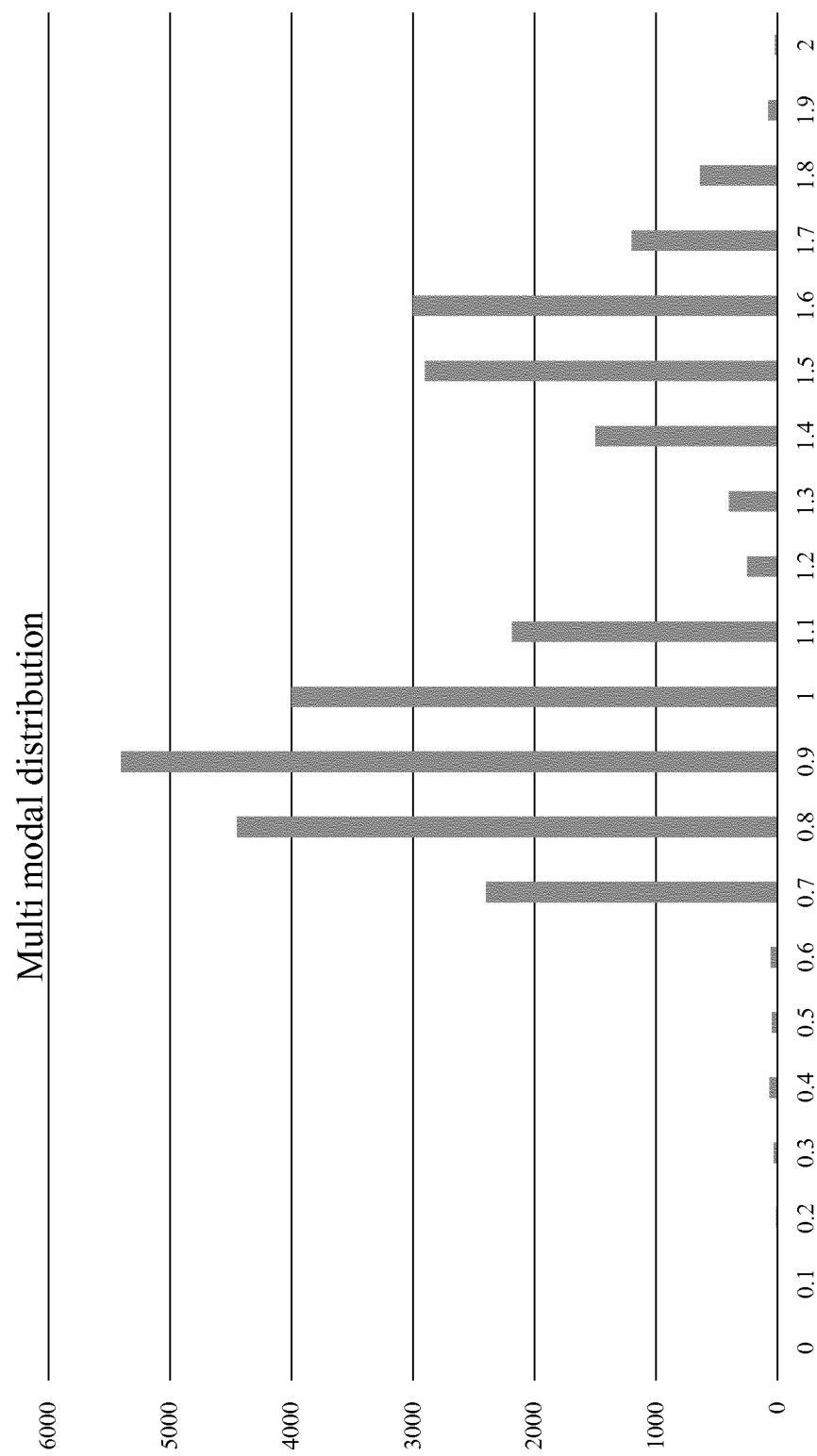
FIG. 5a shows an example of a multi-modal distribution of a parameter.

According to a first example, the selection procedure is based on an analysis of a multi-modal distribution as illustrated in FIG. 5*a*.

The parameter values are reported on the x-axis and the occurrences of parameter value in the whole test set are collected and reported in the cumulated graphics in FIG. 5*a*. In this case, two modes (parameter values) are determined (0.9 and 1.55) as representative for the parameter value represented by said multi-modal distribution.

Figure 5B:
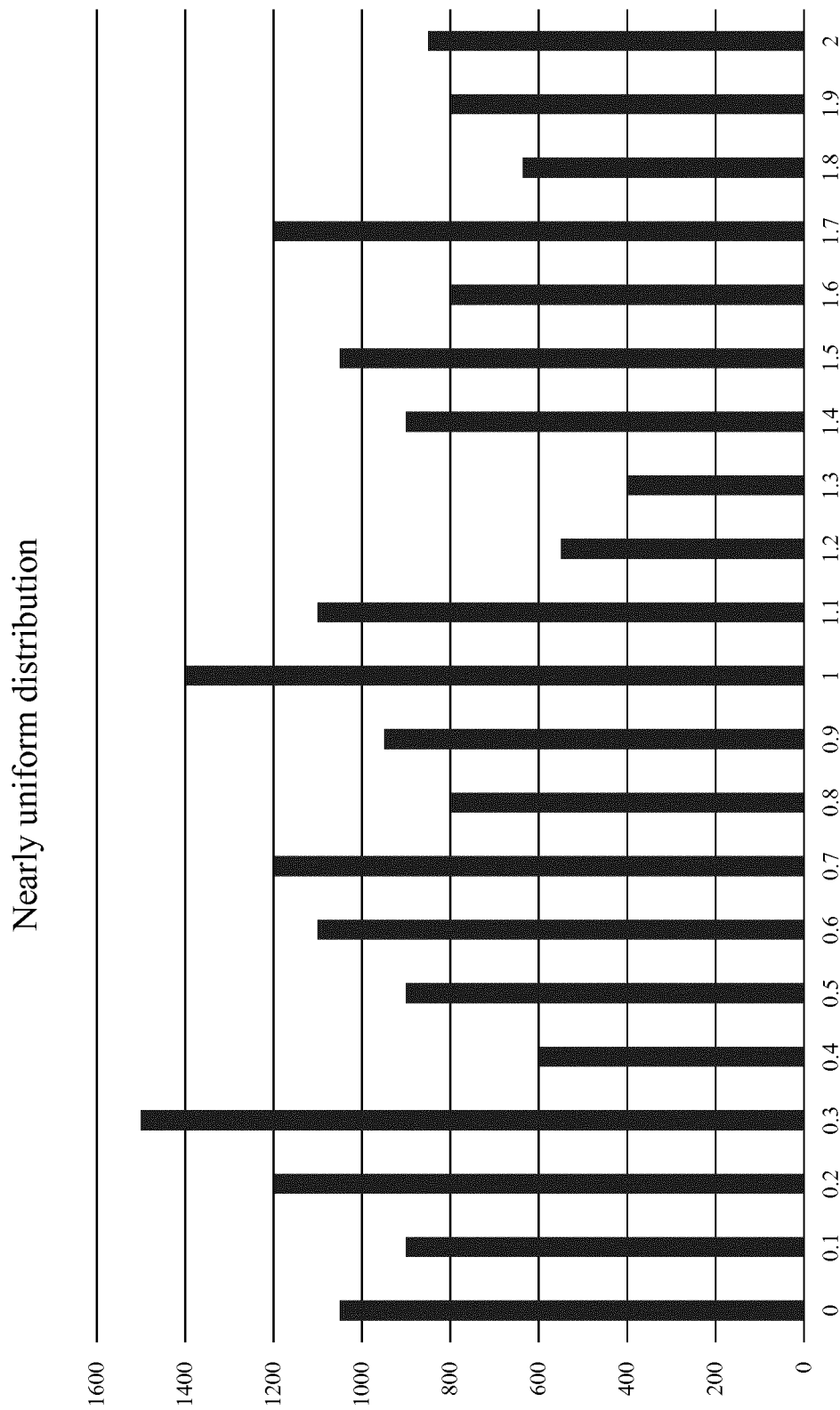
FIG. 5b shows an example of a nearly uniform distribution of a parameter.

It may occur that the multi-modal distribution is not efficient for nearly uniform distribution as illustrated in FIG. 5*b*. In that case, the granularity of the parameter values may be increased in order that new modes appear.

Other approach may be used for selecting modes from a multi-modal distribution such as selecting a specific number of modes from the most significant modes.

Usually, multiple presets are stored and in step 36, the method selects on of them for recovering lost or corrupted parameters.

According to an embodiment of step 36, the method uses a same preset for recovering any lost or corrupted parameters.

For example, when luminance mapping parameters are lost or corrupted, those parameters are recovered from a default preset gathering luminance mapping parameters. A default preset may also be used for recovering color correction parameters.

According to an embodiment of the method, an indicator is explicitly signalled in the bitstream for identifying which preset to be used in a set of previously stored presets.

In that case, in step 36, the method parses the bitstream in order to obtain said indicator and selects/identifies the signaled preset for recovering the lost or corrupted parameters.

According to an embodiment of the method, an indicator is derived from metadata, carried by in the bitstream, for identifying which preset to be used in a set of previously stored presets.

Thus, a dedicated syntax element (to be carried in the bistream) is not required for indicating the selected preset.

For example, presets are defined/indicated/identified for different (possibly ranges of) peak luminance and/or different (possibly ranges of) content/image format color primaries.

FIG. 5*c* illustrates a non-limitative example of a table that maps presets indices with ranges of peak luminance and colour primaries (color gamut).

In accordance with this example, in step 36, the peak luminance value and color primaries may be obtained by parsing the MDCV SEI message carried by the bitstream, and the method may identify the preset to be used for recovering the lost or corrupted parameters according to the value of the obtained peak luminance and/or the obtained color primaries.

According to an embodiment of step 36, the preset used for recovering lost or corrupted parameters is identified according to an indicator hidden in metadata carried by the bitstream.

Thus, a dedicated syntax element (to be carried in the bitstream) is not required for indicating the selected preset.

Preferably, the indicator is hidden in metadata having a higher resilience against the distribution chain.

Reuse of a metadata that usually carries parameters used by the post-processing stage avoid any increase of the bandwidth.

Moreover, the syntax of the existing ETSI specification (TS 103 433) may thus be updated in order to improve interoperability between bitstreams and deployed devices. Deployed devices may thus benefit of a light firmware update to detect the hidden data if required.

FIG. 5*d* illustrates a non-limitative example of a table that maps presets values and the preset indices as defined in FIG. 5*c*.

For example, the indicator is hidden in the peak luminance and/or color primaries data carried by the MDCV SEI message.

By design, the HDR master display max luminance metadata used in ETSI TS 103 433 specification has steps/precision of 50 $cd/m^2$. Said indicator can be hidden in-between steps. Besides, this way, the existing mapping of the associate hdrMasterDisplayMaxLuminance metadata with the MDCV SEI message syntax elements present in AVC or HEVC specifications is not changed. For instance, in HEVC/AVC MDCV SEI message, presets are hidden in the 6 LSB of the variable presetVal derived from the max_display_mastering_luminance syntax element:

presetVal=Min(max_display_mastering_luminance×0, 0001;10000)% 50 where % is defined as modulo.

presetVal50=presetVal[5:0]

presetVal50 value (or presetVal50 value belonging to a range) allows to recover a preset or to map toward specific pre-determined parameter values (such as in the above table in FIG. 5*c*). If one considers three pre-determined parameter values to hide (i;e. NbPresetsValToHide=3) in-between the 50 cd/m² step (i.e. SpaceToHide=50), the mapping between presetVal50 and the actual pre-determined values can be achieved as follows when uniform quantization is considered:

presetIdx=INT[presetVal50×INT[SpaceToHide/NbPresetsValToHide+0.5]]

where INT is the integer part of a rationale.

Alternatively, the same quantization mechanism can be used for hiding pre-determined parameter values in one, two or three color primaries signalled in a SEI message such as, for example the MDCV SEI message.

Hidden an indicator in metadata do not have impact on the HDR reconstruction process.

For example hidden the indicator in the color primaries (picture format/content information) does not have an impact on the color primaries values because as a note in the ETSI TS 103 433 specification stipulates that when color primaries are not exactly those described and specified in the TS 103 433 specification (for mapping hdrMasterDisplayColourSpace), a value that is the closest match should be allocated. Thus few LSB modifications do not impact the regular allocation of hdrMasterDisplayColourSpace variable that relies also on colour primaries carried in MDCV SEI message.

According to an embodiment, the lost or corrupted parameters are recovered from parameters used for reconstructing previous HDR images. For example, the last received parameters associated to the previously decoded picture with associated parameters are stored and re-used with the currently decoded picture when no associated parameters are detected or when associated parameters are corrupted.

According to an embodiment, the lost or corrupted parameters are recovered from a weighted combination of the parameters used for reconstructing previous HDR images. For example, considering a low delay encoding mode (I-P-P-P . . . group of pictures) for an HEVC bitstream, the parameters are correctly received for image 0, 1, 2, 3, 5, 6, 7 and 8, in the decoding order; however parameters associated to image 4 are detected as lost or corrupted. Parameters for image 4 are interpolated as a linear weighting of parameters of previous and next decoded image (i.e. 3 and 5). Alternatively, a linear weighting depending on the position of the decoded image associated to the parameters is applied to the N previous and M next received parameters to the lost or corrupted parameter. If we consider in our example that M=3 and N=2, each parameter value to be recovered is determined as follows:

parameter_value_to_recover_i4=(param_i1×1+ param_i2×2+param_i3×3+param_i5×3+ param_i6×2)/(1+2+3+3+2)

with param_ix being the value of the parameter associated to image with position x in decoding order.

According to an embodiment, the weights used by said weighted combination depends on the temporal distance of the previously reconstructed HDR images and the HDR images to be decoded.

On FIG. 1-5d, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 6:
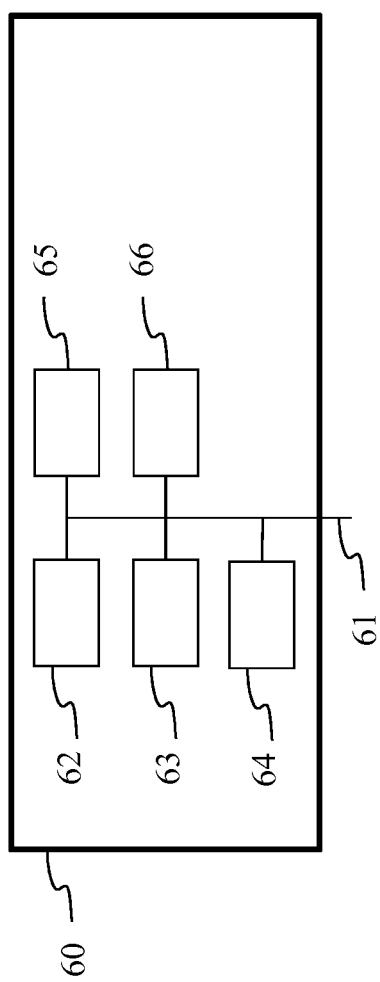
FIG. 6 shows an example of an architecture of a device in accordance with an example of present principles.

FIG. 6 represents an exemplary architecture of a device 60 which may be configured to implement a method described in relation with FIG. 1-5d.

Device 60 comprises following elements that are linked together by a data and address bus 61:
 a microprocessor 62 (or CPU), which is, for example, a DSP (or Digital Signal Processor);
 a ROM (or Read Only Memory) 63;
 a RAM (or Random Access Memory) 64;
 an I/O interface 65 for reception of data to transmit, from an application; and
 a battery 66

In accordance with an example, the battery 66 is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with present principles. When switched on, the CPU 62 uploads the program in the RAM and executes the corresponding instructions.

RAM 64 comprises, in a register, the program executed by the CPU 62 and uploaded after switch on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the HDR video or an HDR image of a HDR video is obtained from a source. For example, the source belongs to a set comprising:
 a local memory (63 or 64), e.g. a video memory or a RAM (or Random Access Memory), a flash memory, a ROM (or Read Only Memory), a hard disk;
 a storage interface (65), e.g. an interface with a mass storage, a RAM, a flash memory, a ROM, an optical disc or a magnetic support;
 a communication interface (65), e.g. a wireline interface (for example a bus interface, a wide area network interface, a local area network interface) or a wireless interface (such as a IEEE 802.11 interface or a Bluetooth® interface); and an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded SDR video or reconstructed HDR video is sent to a destination; specifically, the destination belongs to a set comprising:
- a local memory (63 or 64), e.g. a video memory or a RAM, a flash memory, a hard disk;
- a storage interface (65), e.g. an interface with a mass storage, a RAM, a flash memory, a ROM, an optical disc or a magnetic support;
- a communication interface (65), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the SDR bitstream and/or the other bitstream carrying the metadata are sent to a destination. As an example, one of these bitstream or both are stored in a local or remote memory, e.g. a video memory (64) or a RAM (64), a hard disk (63). In a variant, one or both of these bitstreams are sent to a storage interface (65), e.g. an interface with a mass storage, a flash memory, ROM, an optical disc or a magnetic support and/or transmitted over a communication interface (65), e.g. an interface to a point to point link, a communication bus, a point to multipoint link or a broadcast network.

In accordance with examples of decoding or decoder, the SDR bitstream and/or the other bitstream carrying the metadata is obtained from a source. Exemplarily, the bitstream is read from a local memory, e.g. a video memory (64), a RAM (64), a ROM (63), a flash memory (63) or a hard disk (63). In a variant, the bitstream is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

In accordance with examples, device 60 being configured to implement an encoding method as described above, belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

In accordance with examples, device 60 being configured to implement a decoding method as described above, belongs to a set comprising:
- a mobile device;
- a communication device;
- a game device;
- a set top box;
- a TV set;
- a tablet (or tablet computer);
- a laptop;
- a display and
- a decoding chip.

Figure 7:
FIG. 7 shows two remote devices communicating over a communication network in accordance with an example of present principles.

According to an example of the present principles, illustrated in FIG. 7, in a transmission context between two remote devices A and B over a communication network NET, the device A comprises a processor in relation with memory RAM and ROM which are configured to implement a method for encoding an image as described above and the device B comprises a processor in relation with memory RAM and ROM which are configured to implement a method for decoding as described above.

In accordance with an example, the network is a broadcast network, adapted to broadcast still images or video images from device A to decoding devices including the device B.

A signal, intended to be transmitted by the device A, carries the SDR bitstream and/or the other bitstream carrying the metadata. The SDR bitstream comprises an encoded SDR video as explained before. This signal further comprises metadata relative to parameter values used for reconstructing an HDR video from said decoded SDR video.

The signal further comprises an indicator identifying a set of pre-determined parameters used for recovering lost or corrupted parameters.

According to an embodiment, said indicator is hidden in metadata carried by the signal.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for obtaining a high-dynamic range (HDR) image, the method comprising:
applying a single-layer reconstruction process on a standard dynamic range (SDR) image, the dynamic range of the luminance values of the SDR image being lower than the dynamic range of the luminance values of the HDR image, wherein the single-layer reconstruction process utilizes parameters of a mapping and a color correction for reconstructing the HDR image from the SDR image;
replacing one of the parameters by a recovered parameter when the parameter is not received from a bitstream or when the parameter is received but corrupted, wherein the single-layer reconstruction process utilizes the recovered parameter for reconstructing the HDR image from the SDR image.

2. The method of claim 1, wherein one of the parameters is considered as being corrupted when a value of the one of the parameters is out of a range of values or when one of the parameters does not have a coherent value according to other parameter values.

3. The method of claim 1, wherein a recovered parameter is derived from a set of pre-determined parameter values.

4. The method of claim 3, wherein the set of pre-determined parameter values is identified according to an indicator signaled in the bitstream.

5. The method of claim 4, wherein the indicator is hidden in metadata carried by the bitstream.

6. The method of claim 3, wherein the set of pre-determined parameter values is identified according to an indicator derived from metadata carried by the bitstream.

7. The method of claim 1, wherein the recovered parameter is derived from parameters used for decoding previous HDR images.

8. The method of claim 1, wherein the recovered parameter is derived from a weighted combination of parameters used for decoding previous HDR images.

9. The method of claim 8, wherein the weights used by the weighted combination depend on the temporal distance of the previously decoded HDR images and the HDR images to be decoded.

10. A device comprising at least one processor and at least one memory having stored instructions operative, when executed by the at least one processor, to cause the device to:
reconstruct a high-dynamic range (HDR) image from a standard dynamic range (SDR) image, the dynamic range of the luminance values of the SDR image being lower than the dynamic range of the luminance values of the HDR image, wherein the reconstruction is a single-layer reconstruction that utilizes parameters of a mapping and a color correction for reconstructing the HDR image from the SDR image;
replace one of the parameters by a recovered parameter when the parameters is not received from a bitstream or when the parameters is received but corrupted, wherein the single-layer reconstruction utilizes the recovered parameter for reconstructing the HDR image from the SDR image.

11. The device of claim 10, wherein one of the parameters is considered as being corrupted when a value of the one of the parameters is out of a range of values or when one of the parameters does not have a coherent value according to other parameter values.

12. The device of claim 10, wherein the recovered parameter is derived from a set of pre-determined parameter values.

13. The device of claim 12, wherein the set of pre-determined parameter values is identified according to an indicator signaled in the bitstream.

14. The device of claim 13, wherein the indicator is hidden in metadata carried by the bitstream.

15. The device of claim 12, wherein the set of pre-determined parameter values is identified according to an indicator derived from metadata carried by the bitstream.

16. The device of claim 10, wherein the recovered parameter is derived from parameters used for decoding previous HDR images.

17. The device of claim 10, wherein the recovered parameter is derived from a weighted combination of parameters used for decoding previous HDR images.

18. The device of claim 17, wherein the weights used by the weighted combination depends on the temporal distance of the previously decoded HDR images and the HDR images to be decoded.

19. A non-transitory processor-readable storage medium having stored instructions that are operative, when executed by a processor, to cause the processor to:
apply a single-layer reconstruction process on a standard dynamic range (SDR) video, the dynamic range of the luminance values of the SDR video being lower than the dynamic range of the luminance values of a high-dynamic range (HDR) video, wherein the single-layer reconstruction process utilizes parameters of a mapping and a color correction for reconstructing HDR video from the SDR video;
replace one of the parameters by a recovered parameter when the parameter is not received from a bitstream or when the parameter is received but corrupted, wherein the single-layer reconstruction process utilizes the recovered parameter for reconstructing the HDR image from the SDR image.

\* \* \* \* \*